United States Patent
Jerovsek

(10) Patent No.: US 7,608,803 B2
(45) Date of Patent: Oct. 27, 2009

(54) SETTING OVEN/GRILL TEMPERATURE AND/OR MEAT PROBE USING STEPPER MOTOR ANALOG DISPLAY

(75) Inventor: David Alan Jerovsek, Grand Haven, MI (US)

(73) Assignee: Robertshaw Controls Company, Carol Stream, IL (US)

( * ) Notice: Subject to any disclaimer, the term of this patent is extended or adjusted under 35 U.S.C. 154(b) by 0 days.

(21) Appl. No.: 11/559,536

(22) Filed: Nov. 14, 2006

(65) Prior Publication Data

US 2008/0110999 A1    May 15, 2008

(51) Int. Cl.
- *A21B 1/40* (2006.01)
- *A21B 2/00* (2006.01)
- *F27D 19/00* (2006.01)
- *F27D 21/04* (2006.01)

(52) U.S. Cl. ............... 219/391; 219/413; 219/472; 219/506; 219/720; 99/343; 340/584

(58) Field of Classification Search ............... None
See application file for complete search history.

(56) References Cited

U.S. PATENT DOCUMENTS

| | | | |
|---|---|---|---|
| 4,036,995 A * | 7/1977 | Koether et al. ............... 99/342 |
| 4,420,669 A * | 12/1983 | Scalf et al. ............... 219/506 |
| 4,430,540 A * | 2/1984 | Scalf ............... 219/506 |
| 5,710,409 A * | 1/1998 | Schwarzbacker et al. ...... 219/506 |
| 6,080,972 A * | 6/2000 | May ............... 219/494 |
| 6,578,469 B2 * | 6/2003 | Sharpe ............... 99/342 |
| 6,868,621 B1 | 3/2005 | Grimm et al. |
| 6,933,477 B2 * | 8/2005 | Becker et al. ............... 219/411 |
| D525,895 S | 8/2006 | Jerovsek |
| 7,247,821 B2 * | 7/2007 | Wilsdorf ............... 374/124 |
| 7,258,064 B2 * | 8/2007 | Vaseloff et al. ............... 219/494 |
| 2003/0161922 A1 | 8/2003 | Hillmann |
| 2006/0144384 A1 | 7/2006 | Santagata |

* cited by examiner

*Primary Examiner*—Joseph M Pelham
(74) *Attorney, Agent, or Firm*—Reinhart Boerner Van Deuren P.C.

(57) ABSTRACT

An appliance having an input device, a control, a motor, and an analog display is provided. The input device is employed to input a set point temperature. The control is operably coupled to the input device and receives the set point temperature from the input device. The motor is operably coupled to the control and receives instructions from the control based on the set point temperature. The analog display is operably coupled to the motor. The analog display is driven by the motor to temporarily display the set point temperature and then to display a current temperature as the current temperature increases toward the set point temperature.

10 Claims, 2 Drawing Sheets

SETTING OVEN/GRILL TEMPERATURE AND/OR MEAT PROBE USING STEPPER MOTOR ANALOG DISPLAY

FIELD OF THE INVENTION

This invention generally relates to temperature setting control and display and, in particular, to temperature setting control and display for an appliance using a stepper motor.

BACKGROUND OF THE INVENTION

A typical appliance (e.g., oven, range, grill, etc.) includes an input device, such as a rotatable knob, coupled to a thermostatic control. As the knob is rotated, a set point temperature is provided to the control. When the set point temperature is reached, the control instructs a heat source (e.g., a heating element, a broiler element, etc.) within a cooking chamber (e.g., an oven compartment) of the appliance to stop generating heat.

The conventional appliance also includes a selector switch or similar device operably coupled to the heat source. Depending on how the selector switch is positioned, a particular cooking method (e.g., bake, broil, etc.) is selected. As well known in the art, the knob and the selector switch are, at times, combined into a single, multi-functional device. In such cases, both the set point temperature and the cooking method are input and selected with the lone device.

After the set point temperature has been set and the cooking method selected, the heat source begins to pre-heat or heat the cooking chamber. A sensor operably coupled to the control and installed in the cooking chamber observes the temperature within the cooking chamber. Depending on how the temperature in the cooking chamber compares to the set point temperature, the control instructs the heat source to either provide or prevent further heating. When the set point temperature is reached, the appliance emits a beep, chirp or other signal and the heat source is temporarily turned off. Thereafter, the heat source is toggled on and off to keep the temperature inside the cooking chamber within a desired range relative to the set point temperature.

After the set point temperature has been input and the heat source has begun heating the cooking chamber, but before the set point temperature is reached, a user of the appliance may or may not be informed of the current temperature within the cooking chamber.

Also, many displays found on appliances are digital. To some appliance users, these digital displays and formats are aesthetically unappealing. A user of the appliance employing a digital display is forced to mentally process the numbers, read illuminated numbers, and the like. In contrast, users of appliances with analog displays are able to, for example, simply recognize the position of an indicator relative to a gauge on an analog display. In short, for some consumers, analog displays are much easier to read and use.

There exists, therefore, a need in the art for an appliance that permits a set point temperature for a cooking chamber and a probe thermometer to be provided and also permits a current temperature of the cooking chamber and the probe thermometer to be monitored as the cooking chamber and the probe thermometer are heated. In addition, there is a need for an appliance that includes an analog display which is easier to read, and more appealing for consumers compared to a digital display. The invention provides such an appliance. These and other advantages of the invention, as well as additional inventive features, will be apparent from the description of the invention provided herein.

BRIEF SUMMARY OF THE INVENTION

An embodiment of the present invention provides an appliance that permits a set point temperature for a cooking chamber and a probe thermometer to be provided. The appliance also includes a display that permits a current temperature of the cooking chamber and the probe thermometer to be monitored as the cooking chamber and the probe thermometer are heated. In addition, the appliance includes an analog display which is easier to read, and more appealing, for some consumers compared to a digital display.

In one embodiment of the present invention, an appliance includes an input device, a thermostatic control, a motor, and an analog display. The input device is used to input a set point temperature. The thermostatic control is operably coupled to the input device. The control receives the set point temperature from the input device. The motor is operably coupled to the control. The motor receives instructions from the control based on the set point temperature. The analog display is operably coupled to the motor. The analog display is driven by the motor to display the set point temperature and then to display a current temperature as the current temperature increases toward the set point temperature.

Another embodiment of the present invention provides an appliance including an input device, a thermostatic control, a stepper motor, and an analog display. The input device is used to input a first set point temperature for a cooking chamber and a second set point temperature for a probe thermometer. The thermostatic control is operably coupled to the input device. The control receives the first and second set point temperatures from the input device. The stepper motor is operably coupled to the control. The stepper motor receives instructions from the control based on the first and second set point temperatures. The analog display is operably coupled to the stepper motor. The analog display is driven by the stepper motor to temporarily display one of the first and second set point temperatures and to alternatively display a cooking chamber current temperature as the cooking chamber current temperature increases toward the first set point temperature and a probe thermometer current temperature as the probe thermometer current temperature increases toward the second set point temperature.

In yet another aspect, an embodiment of the present invention provides a method of monitoring cooking temperatures. The method includes the steps of entering a first set point temperature, temporarily displaying the first set point temperature, entering a second set point temperature, and temporarily displaying the second set point temperature. The method also includes the step of alternatively displaying a first current temperature as the first current temperature rises toward the first set point temperature and a second current temperature as the second current temperature rises toward the second set point temperature.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
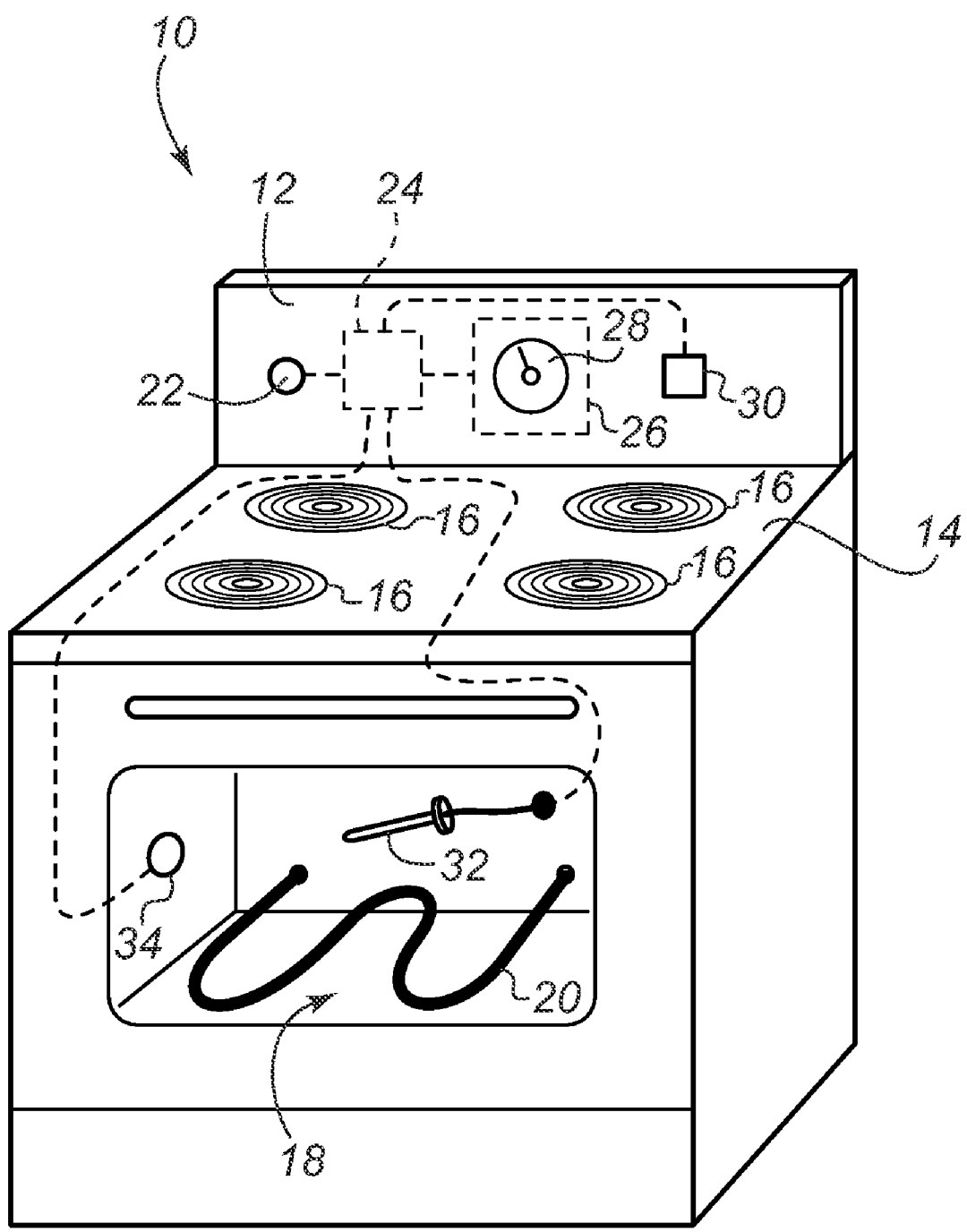
FIG. 1 is a simplified schematic view of an appliance.

Referring to FIG. 1, an appliance 10 employed to cook food is shown. As will be more fully explained below, the appliance 10 permits a set point temperature for a cooking chamber and a probe thermometer to be provided and also permits a current temperature of the cooking chamber or the probe thermometer to be monitored as the cooking chamber and the probe thermometer are heated. The appliance 10 also uses a display with an analog format which is easier to read, and more appealing, for some consumers compared to a display that uses a digital format.

In the illustrated embodiment, the appliance 10 is depicted as an oven (a.k.a., a stove, a range, etc.). However, the appliance 10 could also be a grill or other cooking device. The appliance 10 generally includes, among other things, a forward-facing display panel 12, a stove top 14 holding several burners 16, and a cooking chamber 18. The cooking chamber 18 houses a heat source 20 that, when called upon to do so, generates heat and elevates the temperature within the cooking chamber.

In the illustrated embodiment, the heat source 20 is represented as a lower heating element (a.k.a., a heating coil). In many cases, the heat source 20 also includes a broiler heating element (not shown) vertically spaced above the lower heating element. Depending upon the particular oven setting selected, either or both of the lower heating element and the broiler heating element may be turned on to generate heat, brown food, and the like. The oven racks (not shown) typically found within the appliance 10 have been removed for the purposes of illustration.

The appliance 10 also includes an input device 22, a thermostatic control 24, a motor 26, and an analog display 28. In the illustrated embodiment, each of the input device 22, thermostatic control 24, motor 26, and analog display 28 are disposed on or hidden just behind the forward-facing display panel 12. However, these components are also suitably located elsewhere on the appliance 10.

The input device 22 is generally a rotatable knob, a slew input, directional arrows, or another similar device. The input device 22 is used to provide a set point temperature or temperatures to the control 24. As the input device 22 is manipulated, a set point temperature is increased or decreased. For example, where the input device 22 is a rotatable knob, the set point temperature is increased or decreased depending on whether the knob is rotated in a clockwise or counterclockwise direction.

In one embodiment, the input device 22 includes a reference mark and is flanked by a plurality of spaced-apart or graduated indicia or other markings placed on the front display panel 12. Therefore, when the input device 22 is, for example, a knob that is rotated, the indicia provide a series of visual reference points for a user of the appliance 10 when the user is attempting to input a desired set point temperature.

The thermostatic control 24 is operably coupled to the input device 22. Therefore, the control 24 receives the set point temperature or temperatures from the input device 22. In one embodiment, a selector switch 30 or toggling device is operably coupled to the control 24. The selector switch 30 permits the input device 22 to be used to provide multiple set point temperatures. For example, a first set point temperature for the cooking chamber 18 is input using the input device 22, the selector switch 30 is depressed or otherwise manipulated, and then a second set point temperature for a probe thermometer 32 is input. In one embodiment, the selector switch 30 is simply the "bake" key typically found on an oven. However, other buttons, switches, and the like found on an appliance 10 are also suitably employed for this task.

The thermostatic control 24 is also operably coupled to a temperature sensor 34. The temperature sensor 34 is generally disposed inside the cooking chamber 18 to observe and monitor the temperature therein. Therefore, the control 24 is aware of the temperature within the cooking chamber 18. As noted above, the set point temperature for the cooking chamber 18 is input into the control through the input device 22.

In the illustrated embodiment, the appliance 10 is equipped to utilize and operate in conjunction with the probe thermometer 32 noted above. As those skilled in the art know, the probe thermometer 32 (a.k.a., meat probe) is generally inserted into a food item, such as a piece of meat, before or shortly after the food item is placed in the cooking chamber 18. Because the temperature within the cooking chamber 18 is usually very different from the internal temperature of the food item, the probe thermometer 32 helps to estimate the length of time the food item should remain in the cooking chamber 18 as well as ensure that the food item is thoroughly cooked or cooked to the desired degree.

As shown, the probe thermometer 32 is operatively coupled to the control 24. Therefore, the control 24 is aware of the temperature of the probe thermometer 32. As noted above, the set point temperature for the probe thermometer 32 is, like the set point temperature of the cooking chamber 18, input into the control using the input device 22.

The motor 26 is operably coupled to the control 24. Therefore, the motor 26 is able to receive instructions from the control 24 and, in one embodiment, send information back to the control. In other words, two-way communication is available between the two components. The instructions sent from the control 24 to the motor 26 are based upon the set point temperature or temperatures that have been input using the input device 22. In one embodiment, the motor 24 is a stepper motor.

Figure 2:
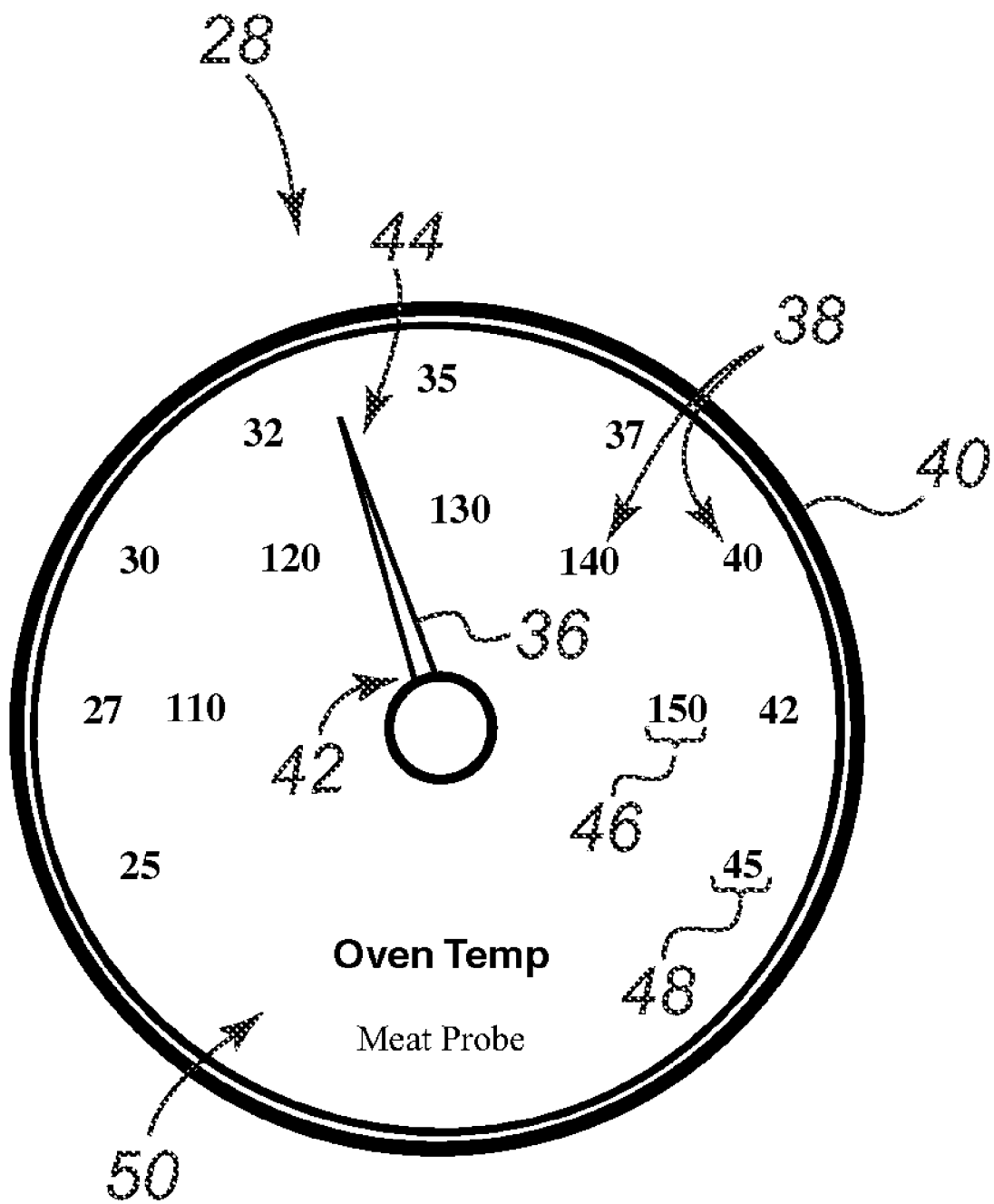
FIG. 2 is a front view of an exemplary embodiment of an analog display for use with the appliance of FIG. 1 in accordance with the teachings of the present invention.

The analog display 28 is operably coupled to the motor 26. Referring to FIG. 2, in the illustrated embodiment the analog display 28 somewhat resembles a gauge such as those found, for example, on a car, boat, or similar vehicle. The analog display 28 includes a pivotable needle 36 and a plurality of indicia 38 or markings spaced along a periphery 40 of the analog display. A first distal end 42 of the needle 36 is pivotally attached proximate the center of the analog display 28 and a second distal end 44 is permitted to sweep past or relative to the indicia 38 as the needle moves. As a result, the analog display 28 is able to provide visual information to the appliance user in a format that is quick and easy to assimilate. In particular, the analog display 28 is able to display a set point temperature and a current temperature as the current temperature increases toward the set point temperature.

In the illustrated embodiment, the indicia 38 about the periphery 40 of the analog display 28 are organized into two groups, namely an inner group 46 and an outer group 48. The inner group 46 of indicia 38 are employed to represent temperatures related to the probe thermometer 32. In contrast, the outer group 48 of indicia 38 are employed to represent temperatures related to the oven chamber 18. In the illustrated embodiment, text 50 is used to visually associate each of the inner and outer groups 46, 48 with, for example, the cooking chamber 18 and the probe thermometer 32. In addition to, or in place of, the text 50, symbols, graphics, and the like are also suitable employed.

In the illustrated embodiment, the words "Oven Temp" and "Meat Probe" are included on the analog display 28 to indicate that the outer group 48 of indicia 38 correlate with the oven (i.e., cooking chamber 18) temperature and the inner group 46 of indicia correlate with a meat probe (i.e., probe thermometer 32) temperature. Further, the numbers "25", "27", "30", "32", "35", "37", "40", "42", and "45" in the outer group 48 of indicia 38 represent oven temperatures of "250", "275", "300", "325", "350", "375", "400", "425", and "450", respectively, while the inner group 46 of indicia depict unabbreviated and actual temperatures of the meat probe. As those skilled in the art will recognize, other orientations of words, phrases, text, and graphics are suitably used on the analog display 28 to convey information to the appliance user.

In operation, if not already attached, the probe thermometer 32 is coupled to the appliance 10 and inserted into a food item. The input device 22 is used to enter a set point temperature for the probe thermometer 32. As the input device 22 is manipulated during this process, the set point temperature of the probe thermometer 32 is relayed to the control 24. The control 24 then instructs the motor 26 to drive the needle 36 of the analog display 28 into the appropriate position to reflect the set point temperature of the probe thermometer 32. In particular, the motor 26 causes the second distal end 44 of the needle 36 on the analog display 28 to generally position itself proximate one of the inner group 46 of indicia 38 in order to indicate the set point temperature. As the desired set point temperature for the probe thermometer 32 is increased or decreased with the input device 22, the needle 36 on the analog display 28 correspondingly moves in real time to reflect the changing temperature.

After the set point temperature of the probe thermometer 32 is provided, the selector switch 30 is depressed or otherwise manipulated to toggle the control 24 into a mode where the set point temperature of the oven chamber 18 is able to be received. Thereafter, the input device 22 is used to enter the set point temperature for the cooking chamber 18. As the input device 22 is manipulated during this process, the set point temperature of the cooking chamber 18 is relayed to the control 24. The control 24 then instructs the motor 26 to drive the needle 36 of the analog display 28 into the appropriate position to reflect the set point temperature of the cooking chamber 18. In particular, the motor 26 causes the second end 44 of the needle 36 on the analog display 28 to generally position itself proximate one of the outer group 48 of indicia 38 in order to indicate the set point temperature. Again, as the desired set point temperature for the cooking chamber 18 is increased or decreased with the input device 22, the needle 36 on the analog display 28 correspondingly moves in real time to reflect the changing temperature.

After both of the set point temperatures have been entered (if the meat probe 32 is used), the appliance 10 is turned on by selecting bake, broil, or another cooking function using the selector switch 30 or another device on the display panel 12. As a result, the heat source 30 is activated and the temperature in the cooking chamber 18 begins to rise. As the temperature within the cooking chamber 18 begins to escalate, the needle 36 on the analog display 28 begins to correspondingly move to reflect the changing temperature. As such, while the temperature in the cooking chamber 18 is increasing, the actual or current temperature of the probe thermometer 32 is reflected on the analog display 28.

To view the actual or current temperature of the cooking chamber 18, as opposed to that of the probe thermometer 32, the appliance user simply depresses or otherwise manipulates the selector switch 30. When the selector switch 30 is depressed, the control 24 is toggled over to a cooking chamber mode. In the cooking chamber mode, the control 24 instructs the motor 26 to drive the needle 36 on the analog display 28 to indicate the current temperature of the cooking chamber 18 instead of the current temperature of the probe thermometer 32. After a predetermined amount of time has elapsed, the control 24 reverts to once again instructing the motor 26 to drive the needle 36 on the analog display 28 such that the current temperature of the probe thermometer 32 is exhibited on the analog display.

From the foregoing, those skilled in the art will recognize that the appliance 10 permits a set point temperature for a cooking chamber and a probe thermometer to be provided and also permits a current temperature of the cooking chamber or the probe thermometer to be alternatively monitored as the cooking chamber and the probe thermometer are heated. The appliance 10 also uses a display with an analog format which is easier to read, and more appealing, for some consumers compared to a display that uses a digital format.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any nonclaimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An appliance comprising:
    an input device for inputting a first set point temperature for a cooking chamber and a second set point temperature for a probe thermometer;
    a thermostatic control operably coupled to the input device, the control receiving the first and second set point temperatures from the input device;
    a stepper motor operably coupled to the control, the stepper motor receiving instructions from the control based on the first and second set point temperatures; and an analog display operably coupled to the stepper motor, the analog display driven by the stepper motor to temporarily display one of the first and second set point temperatures and to alternatively display a cooking chamber current temperature as the cooking chamber current temperature increases toward the first set point temperature and a probe thermometer current temperature as the probe thermometer current temperature increases toward the second set point temperature.

2. The appliance of claim 1, wherein the appliance further comprises a switch, the switch employed to toggle the input device for separate entry of the first and second set point temperatures.

3. The appliance of claim 1, wherein the appliance further comprises a switch, the switch employed to toggle the input device between displaying the first set point temperature and second set point temperature.

4. The appliance of claim 1, wherein the appliance further comprises a switch, the switch employed to toggle the analog display between displaying a first current temperature of the cooking chamber and a second current temperature of the probe thermometer.

5. A method of monitoring cooking temperatures, the method comprising the steps of:
 entering a first set point temperature;
 temporarily displaying the first set point temperature;
 entering a second set point temperature;
 temporarily displaying the second set point temperature; and
 alternatively displaying a first current temperature as the first current temperature rises toward the first set point temperature and a second current temperature as the second current temperature rises toward the second set point temperature on a single display configured to display either of the first current temperature or the second current temperature.

6. The method of claim 5, wherein the method further comprises the step of toggling between entering the first set point temperature and entering the second set point temperature.

7. The method of claim 5, wherein the step of temporarily displaying the first set point temperature and the step of displaying the second set point temperature are each performed using a single analog display.

8. The method of claim 5, wherein the step of alternatively displaying the first and second current temperatures is performed on a single analog display.

9. The method of claim 5, wherein the steps of entering the first and second set point temperatures are performed using a single input device.

10. The method of claim 5, wherein the first set point temperature is for a cooking chamber and the second set point temperature is for a probe thermometer.

\* \* \* \* \*